US012345350B2

United States Patent
Lenz et al.

(10) Patent No.: US 12,345,350 B2
(45) Date of Patent: Jul. 1, 2025

(54) SOLENOID VALVE FOR A SLIP-CONTROLLED MOTOR-VEHICLE BRAKE SYSTEM

(71) Applicant: Continental Teves AG & Co. OHG, Frankfurt am Main (DE)

(72) Inventors: Marc Lenz, Neu-Anspach (DE); Daniel Cvetanovic, Rodgau (DE); Christian Courth, Frankfurt (DE); Heiko Gensert, Eppstein (DE); Holger Kollmann, Rodgau (DE)

(73) Assignee: Continental Automotive Technologies GmbH, Hannover (DE)

( * ) Notice: Subject to any disclaimer, the term of this patent is extended or adjusted under 35 U.S.C. 154(b) by 0 days.

(21) Appl. No.: 17/766,166

(22) PCT Filed: Sep. 28, 2020

(86) PCT No.: PCT/EP2020/077058
§ 371 (c)(1),
(2) Date: Apr. 1, 2022

(87) PCT Pub. No.: WO2021/063866
PCT Pub. Date: Apr. 8, 2021

(65) Prior Publication Data
US 2022/0373096 A1 Nov. 24, 2022

(30) Foreign Application Priority Data
Oct. 2, 2019 (DE) ...................... 10 2019 215 210.4

(51) Int. Cl.
*F16K 31/06* (2006.01)
*B60T 13/68* (2006.01)
(Continued)

(52) U.S. Cl.
CPC ........ *F16K 31/0665* (2013.01); *B60T 13/686* (2013.01); *F16K 1/14* (2013.01); *F16K 27/029* (2013.01); *F16K 31/0696* (2013.01)

(58) Field of Classification Search
CPC ... B60T 8/363; B60T 13/686; B60Y 2400/81; F16K 31/0665; F16K 31/0693; F16K 31/0696; F16K 27/029; F16K 47/00
See application file for complete search history.

(56) References Cited

U.S. PATENT DOCUMENTS

| 5,603,483 | A | 2/1997 | Reuter et al. |
|---|---|---|---|
| 6,113,066 | A | 9/2000 | Hohl |

(Continued)

FOREIGN PATENT DOCUMENTS

| CN | 1622892 A | 6/2005 |
|---|---|---|
| CN | 1740599 A | 3/2006 |

(Continued)

OTHER PUBLICATIONS

German Search Report mailed on Apr. 7, 2020 for the counterpart German Application No. 10 2019 215 210.4.

(Continued)

*Primary Examiner* — Matthew W Jellett

(57) ABSTRACT

A solenoid valve has a valve plunger which is guided in a passage bore of a valve housing. The valve plunger with its valve closing element is held in a basic position by a restoring spring. The basic position opens up a valve passage in a valve seat. The valve plunger is arranged between an inlet and an outlet channel in the valve housing. A magnet armature provides actuation of the valve plunger. An inlet chamber is connected to the inlet channel between the passage bore and the valve seat. The valve plunger protrudes into the inlet chamber by way of a step section. As a result of being hydraulically impinged on by the pressure medium of the inlet channel an axial force is generated on the valve (Continued)

plunger that acts oppositely to the closing direction of the valve plunger.

9 Claims, 2 Drawing Sheets

(51) Int. Cl.
*F16K 1/14* (2006.01)
*F16K 27/02* (2006.01)

(56) References Cited

U.S. PATENT DOCUMENTS

| | | | |
|---|---|---|---|
| 9,163,746 B2 * | 10/2015 | Voss | F16K 31/0658 |
| 10,184,584 B2 * | 1/2019 | Heyer | F16K 31/0658 |
| 2004/0041468 A1 * | 3/2004 | Obersteiner | B60T 8/365 |
| | | | 303/119.2 |
| 2004/0251441 A1 | 12/2004 | Schmitt | |
| 2008/0216643 A1 | 9/2008 | Cano | |
| 2010/0051839 A1 | 3/2010 | Guggenmos | |
| 2011/0198522 A1 | 8/2011 | Ambrosi et al. | |
| 2013/0207015 A1 * | 8/2013 | Vier | F16K 31/0665 |
| | | | 29/890.12 |
| 2018/0056954 A1 | 3/2018 | Courth | |
| 2018/0363799 A1 | 12/2018 | Cano | |
| 2019/0232936 A1 | 8/2019 | Ertle et al. | |
| 2019/0256067 A1 | 8/2019 | Schulz | |

FOREIGN PATENT DOCUMENTS

| | | |
|---|---|---|
| CN | 102177057 A | 9/2011 |
| CN | 107002898 A | 8/2017 |
| CN | 109843667 A | 6/2019 |
| DE | 10002269 A1 | 7/2001 |
| DE | 10036576 A1 | 2/2002 |
| DE | 102006054185 A1 | 5/2008 |
| DE | 102014225251 A1 | 6/2016 |
| DE | 102018114249 A1 | 12/2018 |
| KR | 960703748 A | 8/1996 |
| KR | 20190032595 A | 3/2019 |

OTHER PUBLICATIONS

The International Search Report and the Written Opinion of the International Searching Authority mailed on Dec. 2, 2020 for the counterpart PCT Application No. PCT/EP2020/07758.
Korean Office Action dated Mar. 22, 2023 for the counterpart Korean Patent Application No. 10-2022-7009168 and Global Dossier Translation.
Chinese First Office Action dated Apr. 11, 2023 for the counterpart Chinese Patent Application No. 202080066794.5 and DeepL Translation.
Chinese Office Action dated Aug. 24, 2023 for the counterpart Chinese Patent Application No. 202080066794.5 and translation of same.
Korean Office Action dated Sep. 11, 2023 for the counterpart Korean Patent Application No. 10 2022 7009169 and translation of same.
Notice of Final Rejection issued on Oct. 30, 2024 from corresponding Korean patent application No. 10-2022-7009168.

* cited by examiner

SOLENOID VALVE FOR A SLIP-CONTROLLED MOTOR-VEHICLE BRAKE SYSTEM

CROSS-REFERENCE TO RELATED APPLICATIONS

This U.S. patent application claims the benefit of PCT patent application No. PCT/EP2020/077058, filed Sep. 28, 2020, which claims the benefit of German patent application No. 10 2019 215 210.4, filed Oct. 2, 2019, both of which are hereby incorporated by reference.

TECHNICAL FIELD

The invention relates to a solenoid valve, in particular for slip-controlled motor vehicle brake systems.

BACKGROUND

DE 10 2014 225 251 A1 has already disclosed a solenoid valve composed of a magnet armature for the actuation of a valve plunger, which can be actuated counter to the action of a restoring spring, in a tubular valve housing which has a pressure medium passage in a tubular valve seat body, which valve seat body is closed by means of the plunger-type valve plunger when the magnet armature is excited, wherein the valve plunger extends within a passage bore in the valve housing through the helical restoring spring, which restoring spring is supported on a face surface formed in the region of the passage bore and on the magnet armature.

However, under unfavorable conditions, the valve plunger tends to vibrate due to the hydraulic pressure medium flowing into the valve housing via an inlet channel, which vibrations can lead to a discontinuous throughflow.

Therefore, it is desirable to provide a solenoid valve of the type mentioned at the outset such that the aforementioned disadvantage is avoided.

SUMMARY

A solenoid valve, for slip-controlled motor vehicle brake systems, has a valve plunger which is guided in a passage bore of a valve housing with a small amount of radial play and which, as a result of the arrangement of a restoring spring, remains with its valve closing element in a basic position which opens up a valve passage in a valve seat and which is arranged between an inlet and an outlet channel in the valve housing, and having a magnet armature, which is provided for the electromagnetic actuation of the valve plunger, in the valve housing. An inlet chamber that is permanently connected to the inlet channel is provided in the valve housing between the passage bore and the valve seat. The valve plunger has a step section, which protrudes into the inlet chamber, and in that the step section has a face surface which is impinged on by a pressure medium flowing into the inlet channel in order to generate an axial force that acts oppositely to the closing direction of the valve plunger.

The step section may be arranged on the valve plunger at an axial distance from the valve closing element, wherein the axial distance is at least as large as the clear width of a mouth of the inlet channel into the inlet chamber.

The step section may be formed on the valve plunger between the upper edge of a mouth of the inlet channel into the inlet chamber and the passage bore adjoining the inlet chamber.

The inlet channel may extend axially through the valve housing up to the radial mouth into the lateral surface of the inlet chamber, in sections parallel to the valve plunger, in the direction of the inlet chamber.

The step section may be a cone shape that tapers in the direction of the valve closing element.

The step section may have a shape of an annular surface.

The step section may be produced in conjunction with the valve plunger from a steel blank plastically deformed by cold extrusion or drop forging.

The step section may be produced in conjunction with the valve plunger from a steel blank by a cutting machining process.

The restoring spring, which opens up the valve seat of the valve closing element, may remain a mechanically relaxed state between the magnet armature and the valve housing when in the basic position.

The valve plunger may have, at its region facing away from the valve closing element, a shank cross section that is adapted to the maximum cross section of the step section.

The valve closing element may have the contour of a hemisphere whose diameter is adapted to the diameter of the valve plunger in the inlet chamber.

BRIEF DESCRIPTION OF THE DRAWINGS

The present disclosure will become more fully understood from the detailed description and the accompanying drawings, wherein.

DETAILED DESCRIPTION

Figure 1:
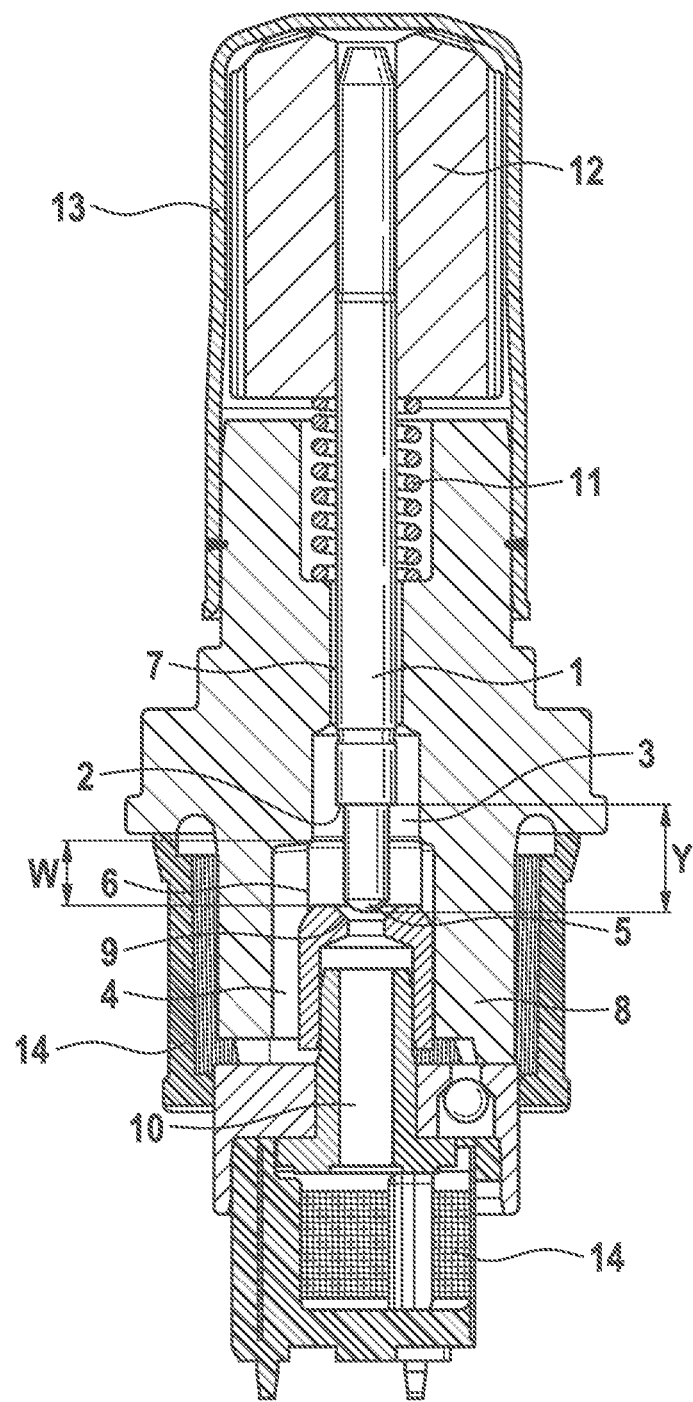
FIG. 1 shows a longitudinal section through a solenoid valve, which has a right-angled step section on the valve plunger at a small distance from the valve closing element.

FIG. 1 shows an enlarged view of a solenoid valve in longitudinal section, which solenoid valve is preferably used for slip-controlled hydraulic motor vehicle brake systems. For the actuation of a valve plunger 1, the solenoid valve has a magnet armature 12 in a cap 13 that is mounted on a tubular valve housing 8. Under the action of a restoring spring 11 arranged between the magnet armature 12 and the valve housing 8, the magnet armature 12, when not electromagnetically excited, remains in abutment against the dome-shaped closed cap 13, such that the valve plunger 1 connected to the magnet armature 12 opens up a pressure medium passage within a valve seat 9.

The valve plunger 1 is guided in the direction of the valve seat 9, with little radial play, in a passage bore 7. In the passage bore 7, there is a step in the form of a bore step on which, in the electromagnetically non-excited position, the restoring spring 11 is supported, without mechanical preload, by way of its end facing away from the magnet armature 12.

The valve seat 9 is situated between an inlet and an outlet channel 4, 10, wherein, both channels may open as vertical channels into the valve housing 8 and may be protected by filter elements 14 to prevent dirt from entering.

In the present exemplary embodiment, the magnet armature 12 is received with a small amount of radial play within the austenitic, sleeve-shaped cap 13, which is welded to the thick-walled, tubular valve housing 8, which ensures secure fastening in a valve receiving bore of a valve receiving body (not illustrated).

The cap 13 may be produced from thin sheet metal by deep drawing, whereas the contour of the tubular valve housing 1 is produced by drop forging or cold extrusion from a steel blank, which has a ferritic material structure in order to form the magnetic circuit.

Between the passage bore 7 and the valve seat 9, an inlet chamber 3 is provided in the valve housing 1, which inlet chamber is permanently connected to the inlet channel 4 and, delimited by the inner wall of the valve housing 1 and the valve plunger 1, forms an annular space into which, when the valve plunger 1 is in the open switching position, the pressure medium enters substantially axially owing to the orientation of the inlet channel 4 and the shape of the inlet chamber 3.

In the electromagnetically non-excited basic valve position as illustrated, the valve plunger 1 thus remains at an axial distance from the valve seat 9, allowing a passage of pressure medium, wherein an unhindered hydraulic connection between the channels (inlet channel 4, outlet channel 10) opening into the valve housing 1 respectively above and below the valve seat may be ensured.

In order to generate an axial force directed oppositely to the closing direction of the valve plunger 1 and caused by the inflowing medium, the valve plunger 1 has a step section 2, the face surface of which is consequently, when it protrudes into the inlet chamber 3, impinged on by the pressure medium that is fed into the inlet channel 4, such that the valve plunger 1, in its electromagnetically non-actuated basic position, cannot be excited to perform undesired vertical vibrations that would under certain circumstances impede the throughflow in the direction of the outlet channel 10.

Figure 2:
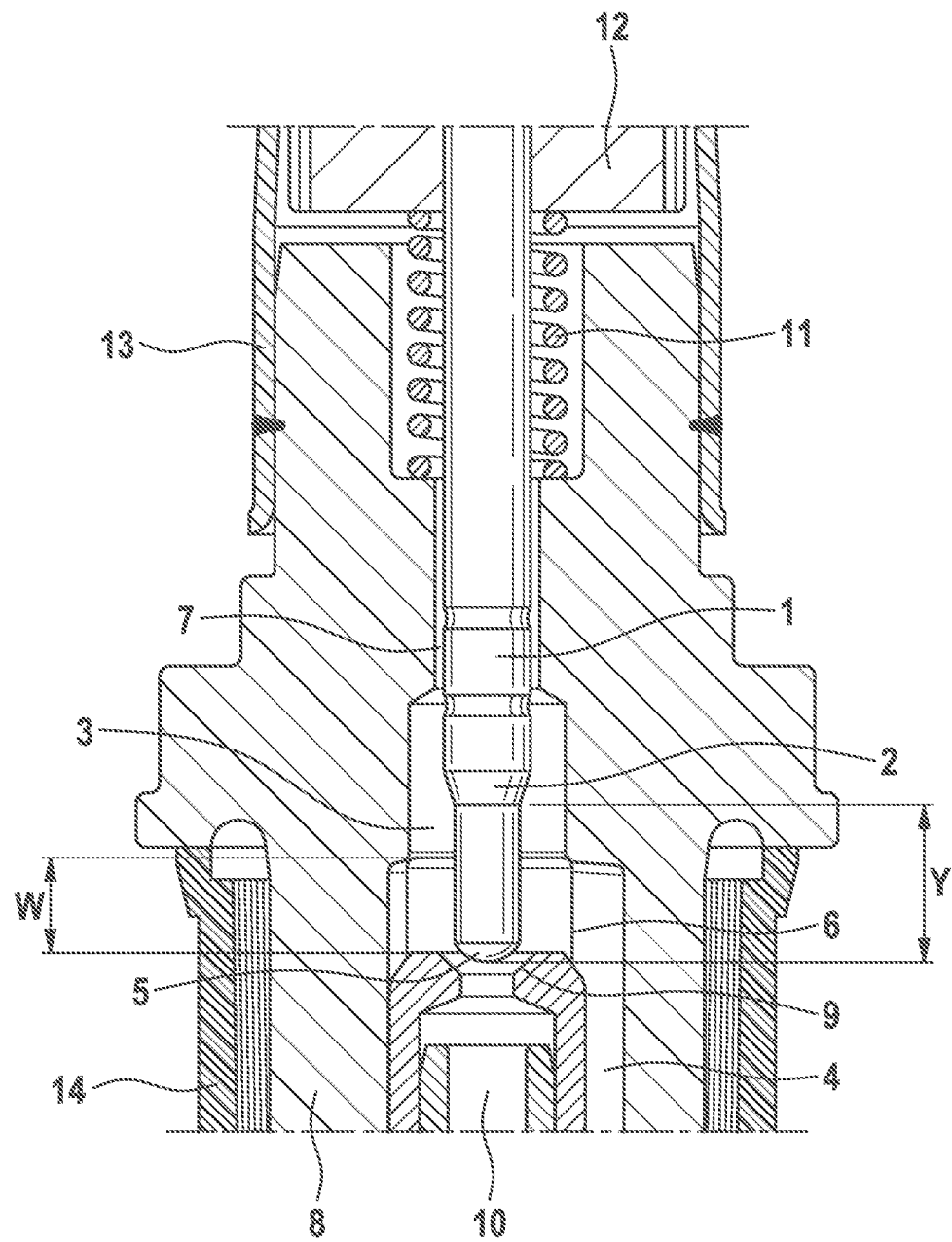
FIG. 2 shows a detail illustration of a solenoid valve in longitudinal section with having an alternate embodiment of a step section on the valve plunger.

As can be seen from FIGS. 1 and 2, the step section 2 may be arranged on the valve plunger 1 at an axial distance Y from the spherical (or, less favorable in terms of flow, conical) valve closing element 5. In the figure, the axial distance Y is at least as large as the vertical width W of the mouth 6 of the inlet channel 4 into the inlet chamber 3.

In addition to the axial distance Y provided between the step section 2 and the valve closing element 5, the shape of the transition of the plunger diameter to the valve closing element 5 influences the undesired vibration behavior of the valve closing element 5, for which reason the transition between the plunger diameter and the valve closing element 5 should be as smooth as possible. The hemispherical shape of the valve closing element 5 shown in FIGS. 1 and 2 therefore represents one solution in terms of flow.

In principle, the step section 2 must be formed on the valve plunger 1 between the upper edge of the mouth 6 of the inlet channel 4 into the inlet chamber 3 and the passage bore 7 adjoining the inlet chamber 3, in order that the step section 2 is hydraulically impinged on substantially axially, or as frontally as possible, by the flow medium oppositely to the closing direction of the valve plunger 1.

Both figures make it clear that, up to its radial mouth 6 into the lateral surface of the inlet chamber 3, the inlet channel 4 extends through the valve housing 8, in sections parallel to the valve plunger 1, in the direction of the inlet chamber 3, such that (in a manner promoted by the mouth 6, which is generously dimensioned in the vertical direction) a substantially axially directed flow pattern is generated as the pressure medium enters the inlet chamber 3. Consequently, the step section 2 is impinged on by the pressure medium oppositely to the closing direction of the valve plunger 1 in an effective manner, as a result of which an unintentional downward movement and/or vibration of the valve plunger 1 counter to the action of the restoring spring 11 in the direction of the valve seat 9 is reliably avoided.

In addition, the step section 2 allows an improved throughflow rate owing to the stabilization of the valve plunger 1, and also allows analog control of the valve owing to the relatively soft restoring spring 11, if desired or required.

As a result of the impingement on the step section initiated by the pressure medium, when the valve closing element 5 is in the basic position that opens up the valve seat 9, the restoring spring 11 remains in a mechanically stress-free state between the magnet armature 12 and the valve housing 8, such that, owing to the relatively low mechanical bracing force of the restoring spring 11, the electrical current requirement for electromagnetically closing the valve can be significantly reduced.

According to FIG. 1, the step section 2 has the shape of an annular surface oriented parallel to the valve seat 9, whereas in FIG. 2, the step section 2 is formed by a cone that tapers in the direction of the valve closing element 5, which cone is adjoined, in a manner adapted in terms of diameter, by the valve plunger 1 in the direction of the valve closing element 5.

Irrespective of the design variants shown for the step section 2, the valve plunger 1 has, in its region facing away from the valve closing element 5, a constant shank cross section which is guided in the passage bore 7 with minimal radial play and which is adapted in each case to the maximum cross section of the step section 2.

Finally, it is proposed to produce the step section 2 in conjunction with the valve plunger 1 either from a steel blank plastically deformed by cold extrusion or drop forging, or by means of a cutting machining process using a machine turning tool.

The invention claimed is:

1. A solenoid valve for a slip-controlled motor vehicle brake system comprising:
    a valve plunger having a valve closing element is guided in a passage bore of a valve housing;
    a valve seat arranged between an inlet and an outlet channel in the valve housing;
    a restoring spring retains the valve plunger in a basic position, wherein a valve passage in the valve seat is open in the basic position;
    a magnet armature to actuate the valve plunger;
    an inlet chamber is defined by the valve housing between the passage bore and the valve seat, wherein the inlet chamber is connected to the inlet channel, wherein the inlet channel extends axially through the valve housing up to a mouth and into a lateral surface of the inlet chamber, in sections parallel to the valve plunger, in the direction of the inlet chamber;
    a step section is defined on the valve plunger, wherein the step section protrudes into the inlet chamber; and
    a face surface defined on the step section, wherein the face surface is impinged on by a pressure medium flowing into the inlet channel, which generates an axial force that acts oppositely to the closing direction of the valve plunger;
    wherein the step section is arranged on the valve plunger at an axial distance from the valve closing element, wherein the axial distance is at least as large as a vertical width of the mouth of the inlet channel into the inlet chamber.

2. The solenoid valve as claimed in claim 1, wherein the step section is formed on the valve plunger between the upper edge of the mouth of the inlet channel into the inlet chamber and the passage bore adjoining the inlet chamber.

3. The solenoid valve as claimed in claim 1, wherein the step section has a cone shape that tapers in the direction of the valve closing element.

4. The solenoid valve as claimed in claim 1, wherein the step section has the shape of an annular surface.

5. The solenoid valve as claimed in claim 1, wherein the step section is produced in conjunction with the valve plunger from a steel blank plastically deformed by one of cold extrusion and drop forging.

6. The solenoid valve as claimed in claim 1, wherein the step section is produced in conjunction with the valve plunger from a steel blank by a cutting machining process.

7. The solenoid valve as claimed in claim 1, wherein the valve plunger has a shank cross section at a region facing away from the valve closing element, and wherein the shank cross-section is adapted to the maximum cross section of the step section.

8. The solenoid valve as claimed in claim 1, wherein the valve closing element has a contour of a hemisphere wherein a diameter of the closing element corresponds to the diameter of the valve plunger in the inlet chamber.

9. The solenoid valve as claimed in claim 1, wherein the valve plunger has a small amount of radial play in the passage bore.

\* \* \* \* \*